(12) United States Patent
Jørgensen et al.

(10) Patent No.: US 11,693,433 B2
(45) Date of Patent: Jul. 4, 2023

(54) THERMAL RELIEF DEVICE

(71) Applicant: Danfoss Power Solutions ApS, Nordborg (DK)

(72) Inventors: Martin Raadkjær Jørgensen, Sønderborg (DK); Michael Winter, Sønderborg (DK)

(73) Assignee: Danfoss Power Solutions ApS, Nordborg (DK)

(*) Notice: Subject to any disclaimer, the term of this patent is extended or adjusted under 35 U.S.C. 154(b) by 652 days.

(21) Appl. No.: 16/704,040

(22) Filed: Dec. 5, 2019

(65) Prior Publication Data
US 2020/0183432 A1    Jun. 11, 2020

(30) Foreign Application Priority Data

Dec. 7, 2018  (EP) ..................................... 18211042

(51) Int. Cl.
*G05D 7/01*    (2006.01)
(52) U.S. Cl.
CPC .................................. *G05D 7/0186* (2013.01)
(58) Field of Classification Search
CPC .................................................... G05D 7/0186
See application file for complete search history.

(56) References Cited

U.S. PATENT DOCUMENTS

| | | | | |
|---|---|---|---|---|
| 4,354,932 A * | 10/1982 | McNeil | ............ | G01N 30/6017 210/291 |
| 4,990,054 A * | 2/1991 | Janocko | ............... | F16J 15/3404 415/230 |
| 5,181,532 A * | 1/1993 | Brodefors | ............ | G05D 7/0186 138/44 |
| 5,407,760 A | 4/1995 | Kasner et al. | | |
| 6,095,491 A * | 8/2000 | Kriesel | ............. | A61M 5/16881 137/355 |
| 6,457,236 B1 * | 10/2002 | White | ................... | B21K 21/16 138/40 |
| 6,682,844 B2 * | 1/2004 | Genc | ................ | H01M 8/04007 429/437 |
| 2003/0215698 A1 * | 11/2003 | Schulte-Ladbeck | ........................ | H01M 50/383 429/86 |
| 2004/0033269 A1 * | 2/2004 | Hei | ........................ | A61K 31/60 424/661 |
| 2006/0240315 A1 * | 10/2006 | Imhof | ................. | H01M 50/308 429/57 |

(Continued)

FOREIGN PATENT DOCUMENTS

CN    2440989 Y    8/2001
CN    104421469 A    3/2015
(Continued)

OTHER PUBLICATIONS

Chinese Office Action and English Translation for Serial No. 201911231912.9 dated Jun. 30, 2021, 12 pages.

*Primary Examiner* — Hunter B Lonsberry
*Assistant Examiner* — Daniel L Greene
(74) *Attorney, Agent, or Firm* — McCormick, Paulding & Huber PLLC

(57) ABSTRACT

A thermal relief device (1) is described comprising a housing (2) having an inlet (3) and an outlet (4) connected by a relief channel (5). Such a thermal relief device should have a simple construction. To this end a microporous structure (10) is arranged between inlet (3) and outlet (4).

19 Claims, 1 Drawing Sheet

(56) References Cited

U.S. PATENT DOCUMENTS

2007/0144238 A1* 6/2007 Mahoney ............... G01N 30/66
73/23.4
2020/0141425 A1* 5/2020 Ruch ......................... F15B 9/08

FOREIGN PATENT DOCUMENTS

| CN | 109469755 A | 3/2019 | | |
|---|---|---|---|---|
| JP | S59112075 U | 7/1984 | | |
| WO | WO-2013144654 A1 | * | 10/2013 | ........... B01D 15/161 |
| WO | 2017139678 A1 | 8/2017 | | |

* cited by examiner

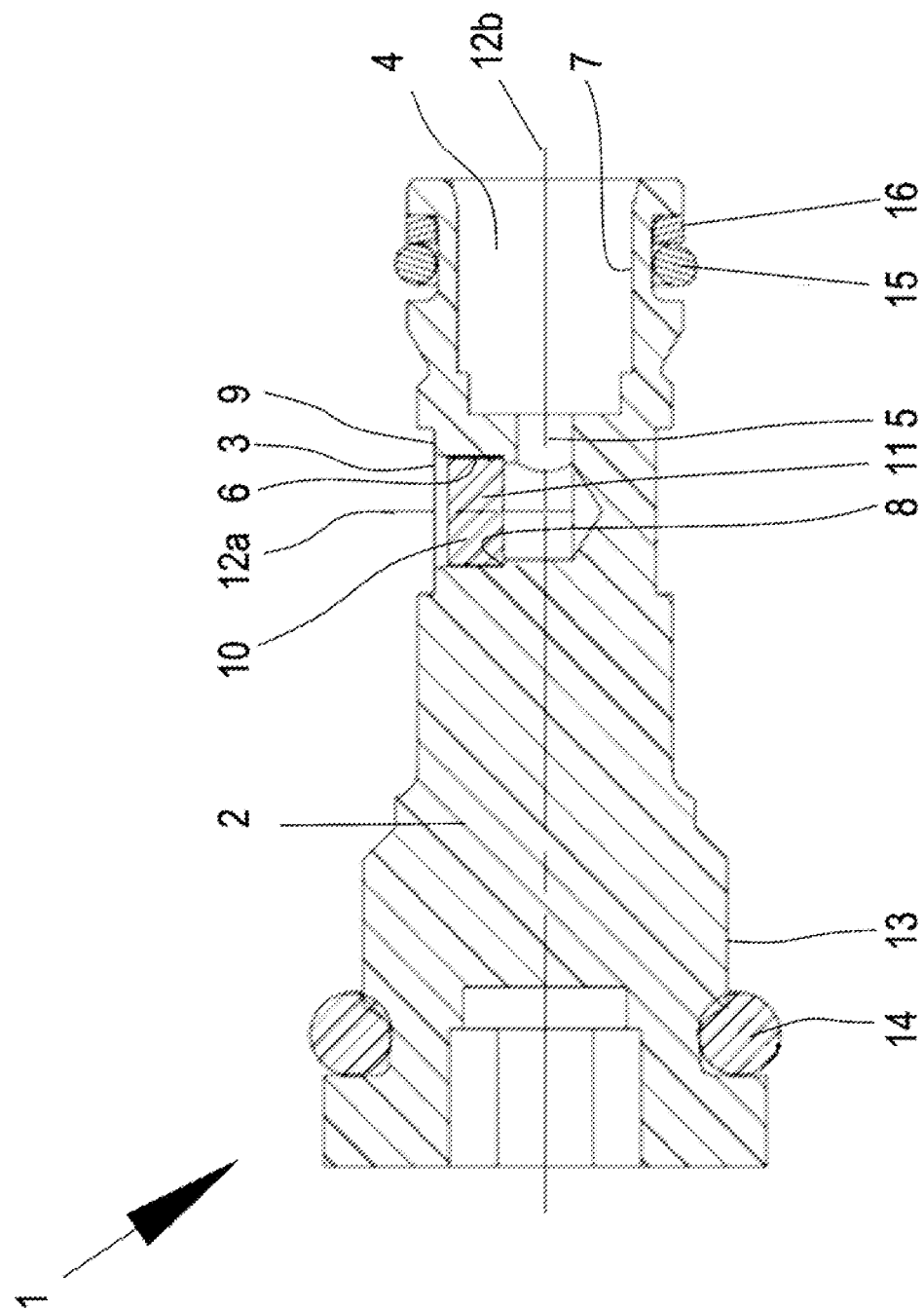

THERMAL RELIEF DEVICE

CROSS-REFERENCE TO RELATED APPLICATION

This application claims foreign priority benefits under 35 U.S.C. § 119 to European Patent Application No. 18211042.9 filed on Dec. 7, 2018, the content of which is hereby incorporated by reference in its entirety.

TECHNICAL FIELD

The present invention relates to a thermal relief device comprising a housing having an inlet and an outlet connected by a relief channel.

BACKGROUND

The function of such a thermal relief device is to protect a hydraulic system from becoming damaged when the hydraulic system is pressurized beyond its design limit, i.e. beyond an allowable maximum pressure, due to thermal expansion of hydraulic oil within an enclosed volume.

The function can be realized by a thermal relief valve having a valve element cooperating with a valve seat. The valve element is loaded by a closing spring in closing direction and by the pressure of the hydraulic system in an opening direction. When the force generated by the pressure exceeds the force produced by the spring, the valve element is moved away from the valve seat so that the valve opens. The valve stays open until the pressure in the hydraulic system has been decreased to the allowable pressure at which the force produced by the pressure is no longer sufficient to overcome the force of the closing spring.

However, the production of such a thermal relief valve is complicated and thus expensive.

SUMMARY

The object underlying the invention is to have a pressure relief device of simple construction.

This object is solved with a thermal relief device as described at the outset in that a microporous structure is arranged between inlet and outlet.

The microporous structure forms a bar between inlet and outlet.

However, when the pressure between inlet and outlet exceeds a predetermined threshold value hydraulic fluid is pressed through the pores of the microporous structure. When the pressure increases, the flow increases as well. The flow rate is controlled by the pore size and the thickness of the microporous structure. The pore size is designed such that below the predetermined threshold value of the pressure there is basically no or only minimal flow through the microporous structure and the hydraulic system which uses the thermal relief device is kept tight. There are no moving parts in this device and no cracking pressure.

In an embodiment of the invention the microporous structure is in form of a frit. A frit is a sintered material which can easily be produced. The pore size can be adjusted depending on the intended threshold value of the pressure.

In an embodiment of the invention the microporous structure is located nearer to the inlet than to the outlet. Accordingly, the microporous structure is on the side of higher pressure so that this higher pressure can be kept outside the housing.

In an embodiment of the invention the housing comprises an inlet bore forming the inlet and an outlet bore forming the outlet, wherein the inlet bore comprises a diameter smaller than the diameter of the outlet bore. When the microporous structure is arranged at or near the inlet, it can have a small cross-sectional area. The flow rate can additionally be adjusted by choosing an appropriate thickness, and/or an appropriate pore size.

In an embodiment of the invention the inlet bore comprises a step forming a diameter reduction in a predetermined distance from an outer surface of the housing. The step is a support for the microporous structure preventing that the microporous structure is pressed further into the housing.

In an embodiment of the invention the relief channel comprises a diameter which is smaller than the diameter of the inlet bore. Usually the flow through the relief channel is small so that it is not necessary to weaken the housing by a large diameter of the relief channel.

In an embodiment of the invention the inlet extends radially to a longitudinal axis of the housing and the outlet extends axially to the longitudinal axis of the housing. The outlet can use almost the whole cross section of the housing so that a large outlet opening can be realized.

In an alternative embodiment of the invention the inlet and the outlet both extend parallel to the longitudinal axis of the housing. The inlet and the outlet can be, for example, colinear, i.e., they can have the same axis.

In an embodiment of the invention the microporous structure is in form of an element mounted in the housing. The microporous structure can be produced separately from the housing.

In an embodiment of the invention the element is held in the housing by press-fit. This is a simple way to mount the element in the housing.

In an alternative embodiment the microporous structure is part of the housing. The whole thermal relief device can, for example, be sintered as a single part with regions of differing densities.

In an embodiment of the invention the housing including the microporous structure is a 3D printed structure. 3D printing a rather simple way of producing the device.

BRIEF DESCRIPTION OF THE DRAWINGS

An embodiment of the invention is now described in more detail with reference to the drawing, in which:

The only FIGURE shows a longitudinal section of a thermal relief device.

DETAILED DESCRIPTION

A thermal relief device 1 comprises a housing 2 having an inlet 3 and an outlet 4. Inlet 3 and outlet 4 are connected by a relief channel 5.

The inlet 3 is formed by an inlet bore 6. The outlet is formed by an outlet bore 7. The inlet bore 6 has a diameter smaller than the diameter of the outlet bore 7. The relief channel 5 has a diameter which is smaller than the diameter of the inlet bore 6.

The inlet bore comprises a step 8 forming a diameter reduction. The step 8 is located in a predetermined distance from an outer surface 9 of the housing 2.

A microporous structure 10 is arranged between the inlet 3 and the outlet 4. In the present embodiment the microporous structure 10 is in form of a frit 11. The frit 11 is press-fit into the housing 2, more precisely into the inlet bore 6. The frit 10 rests against the step 8. Accordingly, the pressure at the inlet 3 is not able to push the frit 11 further into the inlet bore 6.

The microporous structure 10 can be, for example, a sintered material having a predetermined pore size. The pore size and the thickness of the microporous structure 10, i.e. the extension parallel to an axis 12a of the inlet bore 6, which is perpendicular to a longitudinal axis 12b of the housing 2, can be adjusted such that the microporous structure 10 shows a pressure/flow behaviour which is suitable for the intended purpose. The microporous structure 10 is designed such that up to a predetermined threshold value at the inlet 3 there is no or almost no flow through the microporous structure 10. In other words, the thermal relief device is tight up to the predetermined threshold pressure.

However, if the pressure at the inlet 3 exceeds the predetermined threshold pressure, a flow of hydraulic fluid through the microporous structure 10 occurs. The flow rate through the microporous structure 10 depends on the pressure difference over the microporous structure 10, in other words on the pressure difference between inlet 3 and outlet 4. As the pressure difference increases, the flow increases as well. The flow rate is controlled by the pore size and the thickness of the microporous structure 10.

The housing 2 comprises an external thread 13 with which it can be threaded into another hydraulic device, for example a valve housing. A sealing ring 14 is provided to seal the connection between the thermal relief device 1 and the valve housing (not shown) to the outside. The other end of the housing 2 of the thermal relief device 1 bears another sealing ring 15 and a backup ring 16.

The thermal relief device 1 does not require any moving parts. It fulfils the function of a thermal relief valve.

In the embodiment described a microporous structure 10 is an element in form of the frit 11 which is mounted to the housing 2.

It is, however, also possible to form the housing 2 and the microporous structure 10 as a common piece. Such a thermal relief device can be formed, for example, by sintering or by 3D printing. In both cases it is possible to form the thermal relief device as a single part with regions of differing densities.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic thermal relief device for protecting a hydraulic system comprising a housing having an inlet and an outlet connected by a relief channel, wherein a microporous structure is arranged between inlet and outlet, wherein the microporous structure is in form of a frit, wherein a flow rate of hydraulic fluid through the hydraulic thermal relief device is controlled by a pore size and a thickness of the microporous structure, and wherein the pore size and the thickness of the microporous structure are configured to protect the hydraulic system when the hydraulic system is pressurized beyond a predetermined threshold value.

2. The hydraulic thermal relief device according to claim 1, wherein the inlet extends radially to a longitudinal axis of the housing and the outlet extends axially to the longitudinal axis of the housing.

3. The hydraulic thermal relief device according to claim 1, wherein the inlet and the outlet both extend parallel to the longitudinal axis of the housing.

4. The hydraulic thermal relief device according to claim 1, wherein the microporous structure is located nearer to the inlet than to the outlet.

5. The hydraulic thermal relief device according to claim 4, wherein the housing comprises an inlet bore forming the inlet and an outlet bore forming the outlet, wherein the inlet bore comprises a diameter smaller than the diameter of the outlet bore.

6. The hydraulic thermal relief device according to claim 4, wherein the inlet extends radially to a longitudinal axis of the housing and the outlet extends axially to the longitudinal axis of the housing.

7. The hydraulic thermal relief device according to claim 1, wherein the housing comprises an inlet bore forming the inlet and an outlet bore forming the outlet, wherein the inlet bore comprises a diameter smaller than the diameter of the outlet bore.

8. The hydraulic thermal relief device according to claim 7, wherein the relief channel comprises a diameter which is smaller than the diameter of the inlet bore.

9. The hydraulic thermal relief device according to claim 7, wherein the inlet extends radially to a longitudinal axis of the housing and the outlet extends axially to the longitudinal axis of the housing.

10. The hydraulic thermal relief device according to claim 7, wherein the inlet bore comprises a step forming a diameter reduction in a predetermined distance from an outer surface of the housing.

11. The hydraulic thermal relief device according to claim 10, wherein the relief channel comprises a diameter which is smaller than the diameter of the inlet bore.

12. The hydraulic thermal relief device according to claim 1, wherein the microporous structure is an element mounted to the housing.

13. The hydraulic thermal relief device according to claim 12, wherein the element is held in the housing by press-fit.

14. A hydraulic thermal relief device comprising a housing having an inlet and an outlet connected by a relief channel, wherein a microporous structure is arranged between inlet and outlet, wherein the microporous structure is part of the housing, wherein the housing including the microporous structure is a 3D printed structure, wherein a flow rate of hydraulic fluid through the hydraulic thermal relief device is controlled by a pore size and a thickness of the microporous structure, and wherein the pore size and the thickness of the microporous structure are configured to protect the hydraulic system when the hydraulic system is pressurized beyond a predetermined threshold value.

15. The hydraulic thermal relief device according to claim 14, wherein the housing comprises an inlet bore forming the inlet and an outlet bore forming the outlet, wherein the inlet bore comprises a diameter smaller than the diameter of the outlet bore.

16. The hydraulic thermal relief device according to claim 14, wherein the inlet extends radially to a longitudinal axis of the housing and the outlet extends axially to the longitudinal axis of the housing.

17. A hydraulic thermal relief device comprising a housing having an inlet and an outlet connected by a relief channel, wherein a microporous structure is arranged between inlet and outlet, wherein the microporous structure is part of the housing, wherein the housing including the microporous structure is produced by a method of sintering with regions of differing densities, wherein a flow rate of hydraulic fluid through the hydraulic thermal relief device is controlled by a pore size and a thickness of the microporous structure, and wherein the pore size and the thickness of the microporous structure are configured to protect the hydraulic system when the hydraulic system is pressurized beyond a predetermined threshold value.

18. The hydraulic thermal relief device according to claim 17, wherein the housing comprises an inlet bore forming the inlet and an outlet bore forming the outlet, wherein the inlet bore comprises a diameter smaller than the diameter of the outlet bore.

19. The hydraulic thermal relief device according to claim 17, wherein the inlet extends radially to a longitudinal axis of the housing and the outlet extends axially to the longitudinal axis of the housing.

* * * * *